UNITED STATES PATENT OFFICE.

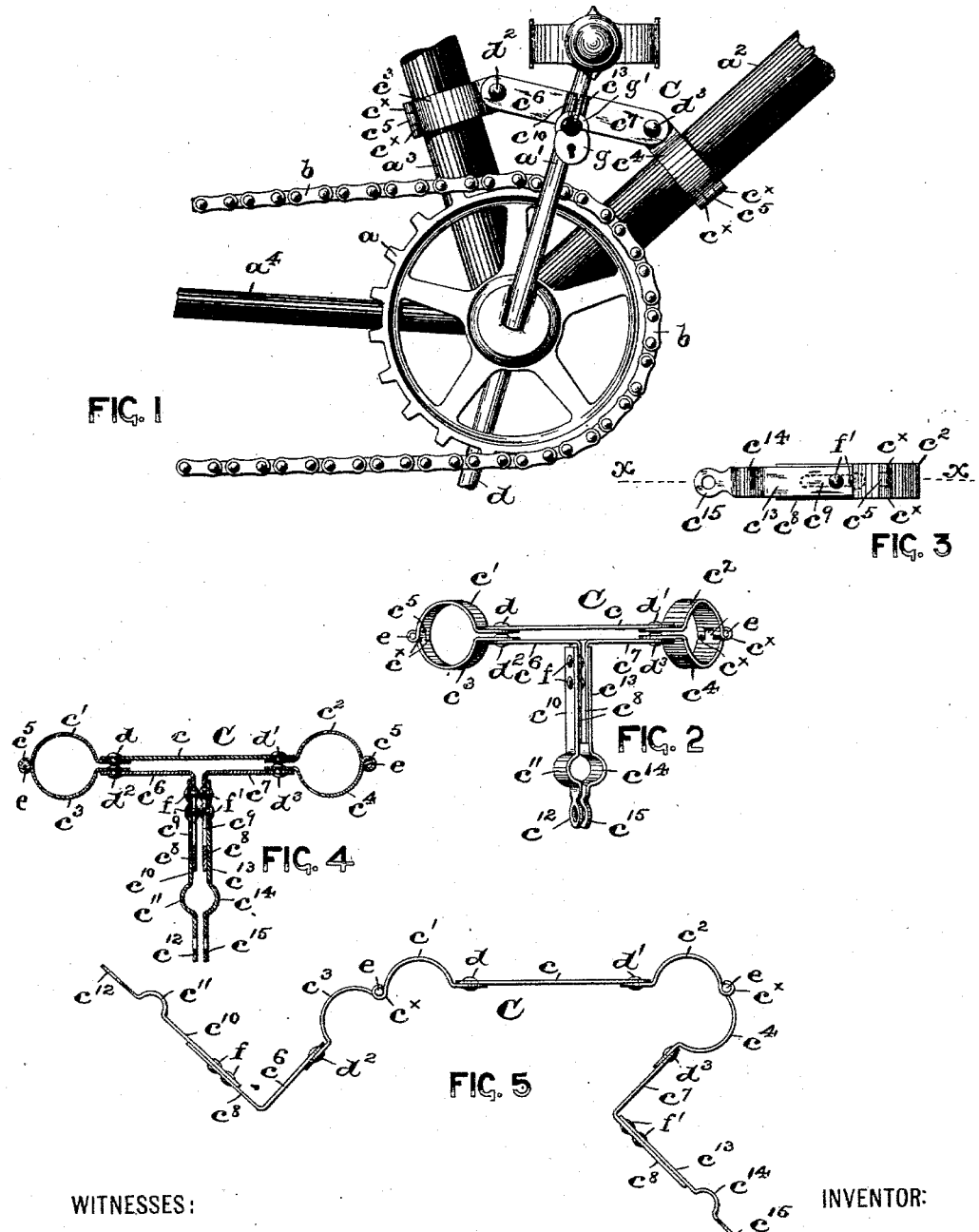

CARL P. R. SCHROEDER, OF HARRISON, NEW JERSEY.

LOCKING MEANS FOR BICYCLES.

SPECIFICATION forming part of Letters Patent No. 589,861, dated September 14, 1897.

Application filed July 15, 1897. Serial No. 644,672. (No model.)

*To all whom it may concern:*

Be it known that I, CARL P. R. SCHROEDER, a citizen of the United States, residing at Harrison, in the county of Hudson and State of New Jersey, have invented certain new and useful Improvements in Locking Means for Bicycles, &c; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has reference to a novel construction of locking or holding means to be used in connection with parts of the vehicle-frame of a bicycle or the like and the pedal-crank to lock the pedal in a fixed position, and hence preventing the motion of the gear-chain and the turning of the wheel operated by means of said chain.

The object of the invention is to provide a simple device for the purposes stated which can be quickly and easily attached to or detached from the several parts of the frame of the vehicle.

The invention therefore consists in the novel construction of locking means hereinafter set forth, and also in the novel arrangements and combinations of parts, such as will be fully described in the accompanying specification and finally embodied in the clauses of the claim.

Referring to the accompanying drawings, in which similar letters of reference are employed in each of the several figures to indicate corresponding parts, Figure 1 is a front elevation of my novel form of locking or holding device in position on the frame of the vehicle and illustrating its locking or holding parts in their locked or holding engagement with the pedal-crank of the vehicle. Fig. 2 is a perspective view of the device when detached, its parts being represented in their relative positions when the device is attached to the frame and the pedal-crank of the vehicle. Fig. 3 is a side view of the device. Fig. 4 is a horizontal section taken on line $x$ in Fig. 3; and Fig. 5 is a top view of the device, illustrating the several hinged sections or parts of the device in their opened positions previous to being secured to the several parts of the bicycle-frame.

Referring to the said parts shown in the several views of the drawings, $a$ indicates the sprocket-wheel on the usual form of crank-shaft in the bottom bracket of a bicycle or velocipede, and $b$ is the link-chain, engaging, in the usual manner, with the sprockets of said wheel. Connected with said sprocket-wheel $a$ in any of the well-known manners are the pedal-cranks $a'$, and the reference-letters $a^2$, $a^3$, and $a^4$ indicate the several portions of the vehicle-frame, connected with the bottom bracket in the usual and well-known manner.

C indicates my novel form of locking or holding device, and it consists, essentially, of a flat band or plate $c$, to each of the opposite ends of which are pivotally secured, by means of suitable rivets, pins, or screws $d$ and $d'$, a pair of semicylindrical plates $c'$ and $c^2$, each of which is provided with a pair of holding loops or eyes $c^\times$, as will be seen more especially from Figs. 1, 2, and 3 of the drawings. Pivotally arranged between said loops or eyes on the respective plates $c'$ and $c^2$ and on pins $e$ therein are the holding loops or eyes $c^5$ of a second pair of semicylindrical plates $c^3$ and $c^4$, with each of which is pivotally connected, by means of suitable rivets, pins, or screws $d^2$ and $d^3$, respectively, a pair of plates $c^6$ and $c^7$, each plate $c^6$ and $c^7$ having an arm $c^8$ formed at a right angle, or approximately so, to the body of the plate with which it is connected, and each arm $c^8$ being preferably provided with a slot $c^9$. Slidably connected with the arm $c^6$, by means of a pin or pins $f$, movably held in the slot in said arm, is a plate $c^{10}$, having a curved part $c^{11}$ and a perforated end $c^{12}$, and slidably connected with the arm $c^7$, by means of a pin or pins $f'$, movably held and secured in the slot in said arm, is a plate $c^{13}$ having a curved part $c^{14}$ and a perforated end $c^{15}$. The several parts of the locking or holding device C are thus pivotally connected and can be made to assume almost any desired position, as will be clearly evident from an inspection of the several figures of the drawings.

To secure the device in position on the frame of the vehicle, it is opened out, as indicated in Fig. 5, the semicylindrical plates $c'$ and $c^3$ arranged around the frame portion $a^3$ and the semicylindrical plates $c^2$ and $c^4$ arranged around the frame portion $a^2$ to bring the several parts to stand in the position indicated in Figs. 1 and 2. The plates $c^{10}$ and $c^{13}$ can now be adjusted by sliding them on their respective arms $c^6$ and $c^7$ and the curved parts $c^{11}$ and $c^{14}$ made to embrace the pedal-crank $a'$. In this manner the perforated ends $c^{12}$ and $c^{15}$ of the respective plates $c^{10}$ and $c^{13}$ are brought directly opposite to each other, and by inserting the hasp $g'$ of a suitable lock $g$ through said perforated ends the device is securely locked in place on the frame and the pedal-crank of the vehicle, whereby the operating mechanism of the vehicle will be immovably held until the device C is again detached from its locked or holding engagement with the several parts of the vehicle.

A cheap, simple, and readily-attachable locking means for a bicycle has thus been devised which is neat and ornamental in appearance, and when not in use can easily be carried in the tool-bag on the vehicle or in the pocket of the rider.

I am aware that changes may be made in the several arrangements and combinations of the parts comprising the device without departing from the scope of my present invention. Hence I do not limit myself to the exact arrangements and combinations of the parts herein described and shown.

Having thus described my invention, what I claim is—

1. A locking or holding means for bicycles or the like, comprising a plate having at each end a pivotally-arranged clamping portion adapted to embrace the frame portions of the bicycle, a pair of clamping or holding plates pivotally connected therewith, adapted to embrace the pedal-crank, and a lock connected with said plates for locking them fast to said crank, substantially as and for the purposes set forth.

2. The herein-described locking means for a bicycle or the like, consisting, essentially, of a plate $c$, a pair of semicylindrical plates $c'$ and $c^2$ at each end of said plate $c$, a pair of semicylindrical plates $c^3$ and $c^4$ hinged to said plates $c'$ and $c^2$, and a pair of clamping-plates connected with said plates $c^3$ and $c^4$, substantially as and for the purposes set forth.

3. The herein-described locking means for a bicycle or the like, consisting, essentially, of a plate $c$, a pair of semicylindrical plates $c'$ and $c^2$ at each end of said plate $c$ a pair of semicylindrical plates $c^3$ and $c^4$ hinged to said plates $c'$ and $c^2$, and a pair of plates $c^6$ and $c^7$ connected with said plates $c^3$ and $c^4$, having arms $c^8$ extending therefrom, and clamping-plates, having holding portions adapted to embrace the pedal-crank, connected with said arms $c^8$, substantially as and for the purposes set forth.

4. The herein-described locking means for a bicycle or the like, consisting, essentially, of a plate $c$, a pair of semicylindrical plates $c'$ and $c^2$ at each end of said plate $c$, a pair of semicylindrical plates $c^3$ and $c^4$ hinged to said plates $c'$ and $c^2$, and a pair of plates $c^6$ and $c^7$ connected with said plates $c^3$ and $c^4$, having arms $c^8$ extending therefrom, and clamping-plates, having holding portions adapted to embrace the pedal-crank, adjustably connected with said arms $c^8$, substantially as and for the purposes set forth.

5. The herein-described locking means for a bicycle or the like, consisting, essentially, of a plate $c$, a pair of semicylindrical plates $c'$ and $c^2$ pivotally attached to the opposite ends of said plate $c$, a pair of semicylindrical plates $c^3$ and $c^4$, hinged to said plates $c'$ and $c^2$, a plate $c^6$ pivotally attached to said plate $c^3$, and a plate $c^7$ pivotally attached to said plate $c^4$, and said plates $c^6$ and $c^7$ having arms $c^8$ extending therefrom, and clamping-plates, having holding portions adapted to embrace the pedal-crank, connected with said arms $c^8$, substantially as and for the purposes set forth.

6. The herein-described locking means for a bicycle or the like, consisting, essentially, of a plate $c$, a pair of semicylindrical plates $c'$ and $c^2$ pivotally attached to the opposite ends of said plate $c$, a pair of semicylindrical plates $c^3$ and $c^4$, hinged to said plates $c'$ and $c^2$, a plate $c^6$ pivotally attached to said plate $c^3$, and a plate $c^7$ pivotally attached to said plate $c^4$, and said plates $c^6$ and $c^7$ having slotted arms $c^8$ extending therefrom, and plates $c^{10}$ and $c^{13}$ slidably arranged on said arms $c^8$, said plates having curved parts $c^{11}$ and $c^{14}$, and perforated ends $c^{12}$ and $c^{15}$, substantially as and for the purposes set forth.

In testimony that I claim the invention set forth above I have hereunto set my hand this 12th day of July, 1897.

CARL P. R. SCHROEDER.

Witnesses:
FREDK. C. FRAENTZEL,
MARCY Z. TRUSDELL.